United States Patent Office 3,411,582
Patented Nov. 19, 1968

3,411,582
CONSOLIDATION OF EARTH FORMATIONS
Orland Orien Dale, Long Beach, Calif., assignor to Byron Jackson Inc., Long Beach, Calif., a corporation of Delaware
No Drawing. Filed June 28, 1966, Ser. No. 561,002
5 Claims. (Cl. 166—29)

ABSTRACT OF THE DISCLOSURE

A method for consolidating an earth formation, such as one traversed by an oil well, which involves injecting into the formation a gelable liquid composition containing water, sodium silicate, and a gelling catalyst therefor, the composition also containing hydrated and swollen powdered attapulgite dispersed therein, and allowing the composition to set in the earth formation. Particulate filler materials may be incorporated in the composition.

---

This invention relates to the consolidation of earth formations, and more particularly to a composition and a method for consolidating earth formations.

In the treatment of oil, gas, or water wells, it is often desired to shut off the flow of fluid from the well into an earth formation through which the well extends, or to block the flow of fluid into the well from such a formation. It is common practice to attempt to alter the injection profile of water injection wells, to shut off water zones encountered in air drilled holes, to plug lost circulation zones, and to plug communication between zones. One known method of consolidating earth formations to accomplish the foregoing objectives involves the injection into the formation of a solution of commercial sodium silicate and a gelling catalyst, such as hydrochloric acid. The solution enters the pores of the formation and sets to form a firm gel, filling the interstices of the formation and stabilizing and consolidating it. The openings in the formation are thus closed, effectively blocking the flow of fluid through the treated zone.

Particulate filler materials, such as loose sand, have been suggested for addition to the catalyzed sodium silicate solution to be injected into an earth formation. Also, finely divided inert solids have been added to the gelable solutions. However, unless the solid materials are extremely fine, it is difficult or impossible to disperse them and maintain them dispersed in the ungelled solution because of its low viscosity. In the low viscosity solution, the particulate solids, to a greater or lesser extent, separate from the liquid in the mixing tanks, in the pipes, and in the well, and are not carried by the liquid into the formation.

Whereas a catalyzed sodium silicate solution will form a firm gel capable of consolidating formations having openings that are relatively small, such a solution may not be effective to stabilize a formation having larger openings or a formation composed of loose sand or gravel particles having very little inherent stability.

It is therefore an object of the present invention to provide an improved method using a gelable composition for injection into porous earth formations and the like to consolidate them, which composition sets to form a highstrength gel capable of effectively blocking flow of fluids through the treated zone.

Another object is to provide a method using a gelable composition of the foregoing nature having an initial viscosity low enough to permit its being pumped and injected into a formation, yet high enough to enable the composition to maintain in suspension coarse or heavy particles of filler materials so that the filler materials will be transported into the formation.

Another object is to provide a method using a gelable, sodium silicate containing solution, including an additive for thickening the solution and for providing a gel of enhanced strength, which additive does not appreciably change the time required for the solution to gel.

Another object is to provide an improved method for consolidating an earth formation in which a thickened, gelable sodium silicate containing solution is injected into the formation and there permitted to gel.

The foregoing, and other objects of the invention as may appear hereinafter, are, to state it briefly, realized in injecting a fluid composition into porous earth formations and the like to consolidate them, the composition including an aqueous solution of sodium silicate and a gelling catalyst therefor, and attapulgite dispersed in the solution to thicken it, the composition being pumpable and injectable into the formation. The composition may have particles of filler or bridging material suspended in it, and the particles may be of relatively large size. The fluid composition of the invention is not adversely affected by naturally occurring brines frequently found in earth formations traversed by wells.

The invention also involves a method for consolidating earth formations which includes injecting into the formation an aqueous solution of sodium silicate and a gelling catalyst therefor, the solution having attapulgite dispersed in it for thickening it, and allowing the solution to gel in the formation.

The gelation of sodium silicate solutions by various catalysts is discussed in a paper entitled, "Gelation of Sodium Silicate," Reynold C. Merrill et al., The Journal of Physical and Colloid Chemistry, vol. 54, No. 6, June, 1950. The use of gelable sodium silicate solutions for the blocking of earth formations surrounding a well, which solutions may include fillers, is disclosed in United States Patent No. 1,421,706, issued July 4, 1922, and in United States Patent No. 3,223,163, issued Dec. 14, 1965.

Attapulgite is a naturally occurring clay mineral found near Attapulgus, Ga.; Quincy, Fla.; and Mormoiron, France. The ideal cell formula of attapulgite has been given by Bradley as $(OH_2)_4(OH)_2Mg_5Si_8O_{20}\cdot 4H_2O$, in which there is considerable replacement of magnesium by aluminum. See "The Structural Scheme of Attapulgite," Am. Mineral., 25, 405–410 (1940). A typical chemical chemical analysis of attapulgite from Attapulgus, Ga., is given by Bradley in the foregoing article as 55.03% $SiO_2$, 10.24% $Al_2O_3$, 3.53% $Fe_2O_3$, 10.49% MgO, 0.47% $K_2O$, 9.73% $H_2O-$, 10.13% $H_2O+$, Total 99.62%. The attapulgite used in the present invention preferably is in the form of a dry, impalpable powder that is free flowing. This powder is readily dispersable in the catalyzed sodium silicate solution, with hydration and swelling of the attapulgite, and appreciable thickening of the fluid composition. In the proportions employed, the attapulgite does not substantially change the setting time of the solution. One brand of attapulgite suitable for purposes of the present invention is sold by Baroid Division, National Lead Company, Houston, Tex., under the trademark "Zeogel."

In general, in preparing the compositions of the invention, a solution of sodium silicate in water is added to an aqueous solution of hydrochloric acid, with agitation of the mixture. The proportions of sodium silicate and hydrochloric acid or other catalyst are chosen, according to known practice, to control the gelling time. Dry, powdered attapulgite is then added to the mixture of liquids while continuing the agitation. The fillers, if any are used, are then added and mixed into the batch. This procedure may be varied; for instance, the attapulgite may be added to the catalyst solution, followed by the sodium silicate solution and the filler materials. Although the order of mixing is subject to variations, it is usually necessary to add the silicate containing solution to the catalyst containing solution to avert immediate gelation of the mixture, which frequently occurs if the catalyst containing solution is added to the silicate containing solution.

The quantity of attapulgite that is added to the aqueous, catalyzed sodium silicate solution will depend upon the degree of thickening desired in the ungelled solution. Generally, the greater the proportion of attapulgite, the thicker the solution. In practice, it has been found that when from about 150 lbs. to about 800 lbs. of attapulgite are added to 1,000 gallons of catalyzed sodium silicate solution, the ungelled fluid compositions are capable of being pumped by conventional oil field pumping equipment into wells and thence into the adjacent earth formations where the compositions will set. In order to obtain a given thickness or viscosity of the initial, ungelled composition, a lesser proportion of attapulgite is required when fillers are also incorporated than when fillers are not used.

The filler materials that may be used in the compositions of the invention include solid, particulate materials such as blocking materials and lost circulation materials. Such materials include gilsonite, expanded perlite, flaked cellophane, and mica flake, to mention a few. These materials may be used in relatively coarse particle sizes without fear of their settling from or floating to the top of the composition. For example, particulate material as coarse as minus 8 mesh, plus 12 mesh, U.S. Sieve Series, is readily carried by the compositions. Even coarser particles may be used. The maximum particle size of the added filler material is limited in practice only by the capability of the pumping equipment to pump the composition. However, particulate filler materials of very fine particle size may often be used advantageously; silica flour of minus 200 mesh, U.S. Sieve Series, may be dispersed in the compositions of the invention. Of course, two or more filler materials may be added to the same thickened, catalyzed, sodium silicate solution.

The proportions of filler materials employed in the compositions of the invention will change depending upon the character of the earth formation to be treated and the capability of the pumping equipment to circulate the compositions. Based on the volume of the catalyzed sodium silicate solution, and not counting the volume of the attapulgite, the following ratios of filler to solution are considered typical:

| Filler: | Ratio, lbs. per gallon |
| --- | --- |
| Perlite, expanded | 1 to 10 |
| Gilsonite | 2 to 8 |
| Silica flour | 2 to 8 |
| Mica flake | 0.1 to 0.4 |
| Flaked cellophane | 0.25 to 0.1 |
| Vermiculite, expanded | 0.5 to 3.5 |

Since aqueous solutions of sodium silicate containing a gelation catalyst are, per se, well known in the art to which the present invention pertains, it is not necessary to describe them here in detail. Reference may be had to the hereinbefore mentioned United States patents and to the Merrill et al. paper for some background information on catalyzed sodium silicate solutions. Attapulgite may be added to such solutions to gain the advantages of the present invention. Hydrochloric acid is the preferred catalyst for use in the present invention, and the acid may contain any of the commonly used inhibitors to render the composition less corrosive towards metal components with which it may come in contact.

The compositions of the invention ordinarily are prepared at the site where they are to be used, as their gelation time is relatively short and they must be injected into the formation before they have set. Control of the gelation time of conventional catalyzed sodium silicate solutions is well understood. In general, the greater the proportions of catalyst, the shorter the gelation time. Temperature also has an effect on gelation time, the general rule being that the higher the temperature the more rapidly will the composition set. The addition of attapulgite, in accordance with the invention, to such catalyzed sodium silicate solutions does not appreciably change their gelation times. Thus, the invention is easily practiced by those persons already familiar with the consolidation or stabilization of earth formations or soils by the injection thereinto of conventional catalyzed sodium silicate solutions.

Further to illustrate the invention, the following examples are given:

EXAMPLE I

An injection well in the Dominguez Field, Los Angeles County, Calif., was taking a large percentage of the injection water in a twelve foot zone at a depth of about 7,000 ft. Normal squeeze cementing operations had been unsuccessful in shutting off water flow into this zone.

The well was filled with sand from its bottom up to the 7,040 ft. depth. A retainer was set in the well at a depth of 6,968 ft. The thief zone was thus isolated between the top of the sand plug and the bottom of the retainer. Tubing was set in the well from the surface through the retainer and lead into the space between the retainer and the sand plug. The temperature of the isolated zone was found to be about 135° F. The earth formation to be treated was known to have a finely porous structure; hence a bridge-off was anticipated using a composition in accordance with the invention and containing no filler material.

A treating composition was prepared as follows. To 549 gallons of aqueous hydrochloric acid solution (8.4% HCl) being vigorously agitated in a tank were added 451 gallons of an aqueous solution of sodium silicate. This sodium silicate solution was prepared by mixing 194 gallons of an aqueous sodium silicate solution, analyzing 8.86% $Na_2O$, 28.35% $SiO_2$, balance-water, with 257 gallons of additional water. The resulting 451 gallons of sodium silicate solution were added to the hydrochloric acid solution at a uniform rate in a time of about seven minutes. Immediately thereafter, 250 pounds of finely powdered, dry attapulgite was incorporated in the HCl-sodium silicate solution while the latter was being agitated, the attapulgite being added uniformly over a period of about five minutes. This composition was then immediately pumped through the tubing into the thief zone over a period of about 45 minutes. This treatment was followed by pumping 215 cubic feet of water down the tubing to clear the tubing of the treating solution and to displace the treating solution into the thief zone. Three days later, the thus treated zone was pressure tested by introducing water into it at a pressure of 1,500 p.s.i. and closing off the tubing. After 50 minutes, the hydrostatic pressure had fallen only to 1,100 p.s.i., and the thief zone was considered to be effectively blocked. Before this treatment, the thief zone was tested and found to be accepting four cubic feet per minute of water under a pressure of 1,800 p.s.i.

EXAMPLE II

A water injection well in the Baldwin Hills Oil Field, Los Angeles County, Calif., developed a thief zone between 1,437 feet and 1,620 feet. This zone was isolated, tested, and found to be taking 16 cubic feet of water per minute at a pressure of 500 p.s.i., and 26 cubic feet per minute at a pressure of 800 p.s.i. The temperature at the thief zone was 110° F.

To 1,000 gallons of 12.5% aqueous hydrochloric acid solution were added, while agitating the solution, 1,000 gallons of sodium silicate solution prepared by mixing together 570 gallons of water and 430 gallons of an aqueous sodium silicate solution analyzing 8.86% $Na_2O$, 28.35% $SiO_2$, balance-water. To this catalyzed sodium silicate solution were added 500 pounds of dry, powdered attapulgite. The composition was prepared in a period of half an hour.

1,000 gallons of this composition was immediately pumped into the thief zone. Into the remainder of the composition was mixed 700 pounds of finely powdered gilsonite, and this mixture was also pumped into the thief zone. The pumping of both increments of treating solution was carried out in a total time of about one half an hour at a pumping pressure of 800 p.s.i.

Two hours after the foregoing treatment had been completed, the thief zone was pressure tested and found to be taking 16 cubic feet per minute of water at a pressure of 700 p.s.i., indicating that the thief zone was insufficiently blocked.

On the following day, 1,000 gallons of hydrochloric acid and sodium silicate aqueous solution were made up, the solution having substantially the same composition as that used the previous day. Into this solution were mixed 250 pounds of dry, powdered attapulgite, followed, after the mixture had thickened, by 4,100 pounds of finely powdered gilsonite, and 600 pounds of coarse gilsonite containing particles up to a size of about three sixteenths of an inch in diameter. These ingredients yielded 2,000 gallons of fluid mixture. This mixture was promptly pumped into the thief zone at an initial pressure of 450 p.s.i. which rose to a final pressure of 900 p.s.i.

The well was allowed to stand until the next day, when a pressure test of the thief zone showed it to be taking only 3 cubic feet of water per minute at an injection pressure of 900 p.s.i. This was considered to be a practically successful blocking of the thief zone.

EXAMPLE III

A composition in accordance with the invention and suitable for blocking earth formations against flow of fluids such as water, brine, gas and oil is composed of the following ingredients:

(a) 1,250 gallons of 12.5% hydrochloric acid aqueous solution.

(b) 1,250 gallons of sodium silicate aqueous solution formed by mixing 715 gallons of water with 535 gallons of an aqueous solution of sodium silicate analyzing $Na_2O$—8.86%, $SiO_2$—28.35%, water-balance.

(c) 1,250 pounds of dry attapulgite powder.

(d) 15,000 pounds of powdered gilsonite.

(e) 1,000 pounds of mica flake.

The composition is made by mixing the sodium silicate solution into the hydrochloric acid solution, adding the attapulgite, and thereafter adding the gilsonite and the mica flake.

The foregoing examples are illustrative and are not to be taken as limiting the invention set forth in the appended claims. In the light of the description, various modifications of the invention will occur to those skilled in the art of stabilizing soils and consolidating earth formations without departing from the invention herein disclosed and claimed.

I claim:

1. A method for consolidating an earth formation and the like which includes the steps of:
    (a) admixing water, sodium silicate, and a gelling catalyst therefor in proportion to form a gelable liquid composition;
    (b) injecting said composition, prior to its gelation, into a porous earth formation;
    (c) and allowing said composition to set in the earth formation to form a gel substantially blocking the flow of fluids through the formation;

wherein the improvement comprises the step of dispersing hydratable and swellable powdered attapulgite in said gelable composition, allowing said attapulgite to hydrate and swell prior to its injection into said earth formation, said attapulgite being added in an amount sufficient to substantially thicken said composition prior to its gelation while retaining its ability to be injected into the formation, to substantially retain its setting time, and to increase the strength of the gel into which it sets.

2. A method as defined in claim 1 including suspending particulate filler material in said gelable liquid composition prior to its injection into said earth formation, said attapulgite assisting in maintaining said filter material in suspension.

3. A method as defined in claim 1 including dispersing said attapulgite in said gelable liquid composition in the proportion of from about 150 pounds to about 800 pounds of attapulgite per 1,000 gallons of said gelable liquid composition.

4. A method as defined in claim 3 including suspending particulate filler material in said gelable liquid composition prior to its injection into said earth formation, said attapulgite asisting in maintaining said filler material in suspension.

5. A method as defined in claim 1 wherein said gelling catalyst is hydrochloric acid.

References Cited

UNITED STATES PATENTS

| | | | |
|---|---|---|---|
| 1,421,706 | 7/1922 | Mills | 166—29 |
| 2,236,147 | 3/1941 | Lerch et al. | 166—29 |
| 3,024,125 | 3/1962 | Lee | 106—84 X |
| 3,146,828 | 9/1964 | Mann | 166—29 X |
| 3,208,523 | 9/1965 | Coyle et al. | 166—29 |

CHARLES E. O'CONNELL, *Primary Examiner.*

STEPHEN J. NOVOSAD, *Assistant Examiner.*